United States Patent [19]

Kurihara

[11] Patent Number: 4,753,702

[45] Date of Patent: Jun. 28, 1988

[54] METHOD AND APPARATUS FOR STICKING A MULTIPLICITY OF ORNAMENTAL PIECES ONTO A BASE SHEET MATERIAL

[75] Inventor: Akira Kurihara, Gunma, Japan

[73] Assignee: Jacob Schlaepfer & Co., AG, Switzerland

[21] Appl. No.: 488,545

[22] PCT Filed: Jul. 10, 1982

[86] PCT No.: PCT/EP82/00148

§ 371 Date: Mar. 14, 1983

§ 102(e) Date: Mar. 14, 1983

[87] PCT Pub. No.: WO83/00349

PCT Pub. Date: Feb. 3, 1983

[30] Foreign Application Priority Data

Jul. 18, 1981 [JP] Japan .............................. 56-111545

[51] Int. Cl.[4] ........................ B29C 65/00; B32B 31/18

[52] U.S. Cl. .................................... 156/251; 156/230; 156/239; 156/261; 156/277; 156/353; 156/361; 156/362; 156/518; 156/519; 156/553; 156/583.1

[58] Field of Search .......................... 156/72, 518–521, 156/581, 583.1, 583.4, 553, 230, 238–241, 261–262, 277, 351, 361–362, 63, 384, 353, 250, 251, 272.2, 273.7, 324, 515, 522; 242/183; 428/542.2, 79, 47

[56] References Cited

U.S. PATENT DOCUMENTS

| | | | |
|---|---|---|---|
| 2,642,116 | 6/1953 | Fisher et al. | 156/520 |
| 2,739,628 | 3/1956 | Kok | 156/362 |
| 3,191,180 | 6/1965 | De Graef | 242/183 |
| 3,729,149 | 4/1973 | van de Wijngaert | 242/183 |
| 3,984,273 | 10/1976 | Said | 156/238 |
| 4,120,718 | 10/1978 | Hudalla | 156/518 |
| 4,132,583 | 1/1979 | Hodgson | 156/361 |
| 4,175,997 | 11/1979 | Muller | 156/553 |
| 4,239,526 | 12/1980 | Taki et al. | 156/302 |
| 4,245,897 | 1/1981 | Beauviala et al. | 242/183 |
| 4,364,791 | 12/1982 | Kincheloe | 156/518 |
| 4,369,082 | 1/1983 | Kerwin | 156/240 |
| 4,379,012 | 4/1983 | Barta | 156/240 |
| 4,381,601 | 5/1983 | Tamai et al. | 156/299 |

FOREIGN PATENT DOCUMENTS 2065031 6/1981 United Kingdom .

*Primary Examiner*—Merrell C. Cashion, Jr.
*Attorney, Agent, or Firm*—Ostrolenk, Faber, Gerb & Soffen

[57] ABSTRACT

A method and apparatus are disclosed for sticking ornamental pieces onto a web of material in which the web and a sticking head are positioned relative to each other so that each ornamental piece can be placed on the web by the sticking head at a predetermined position. The sticking head has a cutting edge for cutting each article before it is pressed against the web. An ornamental piece cut from a tape of material by the cutting edge and attached to the lower side of the sticking head is positioned and stuck onto the web so as to achieve a desired pattern on the web. The web and the sticking head are positioned relative to each other at each position to which an ornamental piece should be stuck in order to achieve the desired pattern on the web. Each ornamental piece may be cut out from a tape of material having a hot-melt layer, which is heated by an element opposite the sticking head when the piece is stuck onto the surface of the web. After a series of cycles of the sticking operation is performed, a predetermined pattern is created on the web.

19 Claims, 8 Drawing Sheets

TIMING CHART FOR STICKING OPERATION

METHOD AND APPARATUS FOR STICKING A MULTIPLICITY OF ORNAMENTAL PIECES ONTO A BASE SHEET MATERIAL

BACKGROUND OF THE INVENTION

1. Field of the Invention

The present invention relates to a method of and an apparatus for sticking a multiplicity of ornamental pieces onto an elongate base sheet material to create a desired pattern or motif.

2. Description of the Prior Art

Embroidering machines have heretofore been known which cut ornamental pieces of desired dimensions and shapes from an ornamental tape and sew such ornamental pieces to a piece of cloth to create a desired motif or pattern.

With such known apparatus, it is necessary to provide a central hole in each ornamental piece for passage therethrough of a sewing needle. The necessity to form such a central hole imposes a limitation on the shape of ornamental pieces for example the known apparatus cannot be used on such ornamental pieces which are rectangular in shape and quite narrow. Furthermore, use of an embroidering machine results in only a limited rate of production

SUMMARY OF THE INVENTION

According to the present invention, there is provided a method of decorating a web of material with a plurality of discrete articles using a coating layer of heat activable adhesive which method, in one embodiment, comprises:

(a) presenting said web at a decorating station;
(b) causing said web to move in integer steps in a first direction;
(c) applying said articles to said web individually or in groups disposed on a line transverse to said first direction, each article being applied with said adhesive coating between said web and said article;
(d) applying heat to said coating with the latter in adhesive contact with the web and
(e) moving said web to said decorating station when the application of all the articles to be applied on said transverse line is complete, whereby after a series of sequential cycles of applying said articles to said web, the series is repeated to form a predetermined motif on said web.

The method of the invention is particularly useful for forming an ornamental pattern or motif from an ornamental foil or sheet having a coating of hot melt as a heat activable adhesive.

The base material employed in the method of the present invention may be an elongate flat material such for example as a piece of fibrous cloth, a sheet of paper or resin on which a decorative motif is to be formed by arranging ornamental pieces. The ornamental pieces, having hot-melt layers, may be stuck directly to the base sheet material with the application of heat. According to the method of the present invention, it is also possible to place ornamental pieces having hot-melt layers on the elongate base sheet material which has an adhesive layer on its surface in accordance with a desired decorative pattern, and to press the ornamental pieces against the base sheet material, thus forming a thermally transferrable print sheet. In use, the surface of such a thermally transferrable print sheet in which the pattern of ornamental pieces is carried is held against a surface of an object such as garment cloth, and the hot-melt layers in the ornamental pieces which are in contact with the cloth are fused into the cloth under heat applied by a heating roller. After the pattern of ornamental pieces has been transferred to the object material, the sticky base sheet is peeled off. Thus, the desired transferred motif is formed on the cloth. Instead of using the heating roller, the user may heat the ornamental pieces by ironing.

Accordingly, the present invention relates to a method of and an apparatus for applying a desired motif pattern on a base material with sticking means, the base material being selected from two kinds of material is to serve the purpose for which the sheet carrying ornamental pieces is fabricated. According to the method of the invention, a base sheet material having an area kept horizontally taut by rollers or other guide members on a stationary frame is controllably fed for longitudinal positioning, and at the same time heads for sticking ornamental pieces are controllably positioned widthwise of the base sheet material so that the base sheet material and the sticking heads are controllably moved for relative biaxial positioning to determine a position in which ornamental pieces are to be applied to the base sheet material in a desired pattern. Then, ornamental tapes having hot-melt layers are drawn to a desired length below the sticking heads, and press heads having cutting edges are lowered to cut off ornamental pieces from the tapes, while at the same time an anvil disposed below the base sheet material is moved upwardly. The press heads and the anvil move toward each other until the ornamental pieces are stuck onto the base sheet material, whereupon one cycle of operation for forming and applying ornamental pieces is completed. Such operation will then be repeated to stick ornamental pieces successively onto the base sheet material at positions thereon which have previously been determined.

When a thermally transferrable print sheet is to be manufactured, that is, a base sheet material having a sticky adhesive layer on its surface is to be employed, ornamental element layers of ornamental pieces are placed in face-to-face relation to the adhesive layer on the base sheet material, with hot-melt layers directed outwardly, and only the press heads are actuated to apply the ornamental pieces to the base sheet material. When ornamental pieces are to be stuck directly onto a base sheet material such as cloth, the anvil located downwardly of the base sheet material is heated, and hot-melt layers in the ornamental pieces are held against the surface of the cloth. The hot-melt layers are fused to the base material when the latter is in contact with the heated anvil. One cycle of sticking operation is thus finished. The hot-melt layers in the ornamental tapes are made of thermoplastic synthetic resin such as nylon 12 and placed as film or fusable layers on surfaces of ornamental piece sheets such as metal foils, for example.

The invention also includes apparatus for the application of discrete articles to a web of material by the above methods which apparatus has transport means for presenting a web of material in integer steps in a first direction at a decorating station, means for applying articles disposed to said web with a coating of a heat activable material disposed between the web surface and said article along a line transverse to said first direction, means for heating said coating to cause or allow adhesion between said web and each article, and control means for said transport means to move said web when the application of all the articles along said transverse line is complete.

The apparatus according to the present invention may include a region in which the base sheet material is kept horizontally taut and ornamental pieces are applied to the base sheet material as positioned in accordance with a pattern of ornamental pieces previously designed. In one embodiment the apparatus comprises a stationary base frame having therein a pair of rotatable rollers or fixed feed guide members on which the elongate base sheet material is stretched, the above region being defined between the rotatable rollers or fixed feed guide members. A positioning roller may be mounted on the base frame for contact with the base sheet material to maintain tension in the base sheet material and to feed the latter longitudinally in one or opposite direction, the positioning roller having a shaft coupled to a numerically controlled driving motor for feeding the sheet material along a Y-axis. The base frame preferably supports a stationary guide track extending widthwise of the base sheet material and carrying a support member slidably thereon, the support member being coupled to a numerically controlled driving motor so as to move along an X-axis widthwise of the base sheet material for an interval determined by a numerical input command applied to the driving motor. A mechanism for intermittently supplying ornamental tapes having a hot-melt coating layer may be mounted on the support member and may have a tape lead-out position, adjacent to which press heads having cutting edges on frontal edge portions are disposed for being actuated by pneumatic cylinders mounted on the support member. There may be further provided a anvil mounted on the base frame in register with the press heads with the base sheet material interposed therebetween and extending the full width of the base sheet material, the elongate anvil being actuatable by pneumatic cylinders fixed to the base frame. The anvil located below the press heads preferably has an adjustable built-in heater and can be used to stick ornamental pieces directly onto the base sheet material. The press heads disposed above the anvil are arranged in an array extending widthwise of the sheet material for automatic mass-production of ornamental pieces.

Following is a description by way of example only and with reference to the accompanying drawings of methods of carrying the invention into effect.

BRIEF DESCRIPTION OF THE DRAWINGS

In the drawings:

FIG. 5 (*b*) is an enlarged perspective view of sticking heads and a tape supply mechanism in the apparatus;

FIG. 5 (*c*) is a diagram showing an electric control circuit system according to the present invention;

FIG. 6(*c*) is a partially exploded, enlarged view of the tape supply mechanism in the apparatus.

DETAILED DESCRIPTION OF THE PREFERRED EMBODIMENTS

Figure 1A:
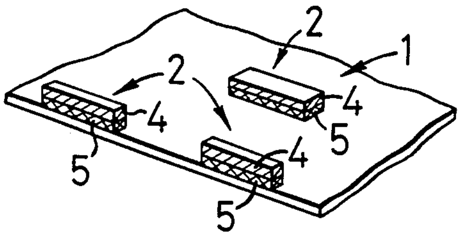
FIGS. 1 (*a*), (*b*) and (*c*) are perspective views of various ornamental pieces with hot-melt layers as stuck to surfaces of base sheet materials.
Figure 1B:
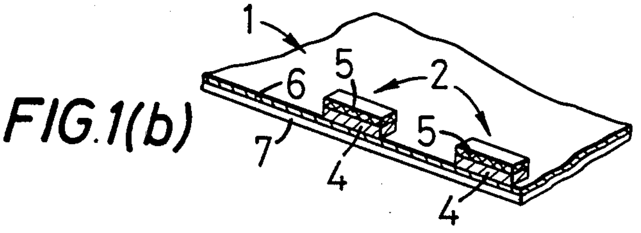
Figure 1C:
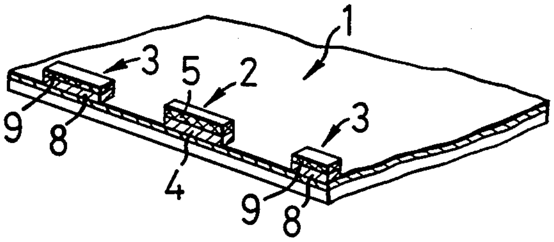

FIGS. 1(*a*), (*b*) and (*c*) show ornamental pieces 2 and colored ornamental pieces 3 stuck to and arranged on an elongate base sheet material 1. FIG. 1(*c*) is illustrative of such an ornamental piece 2 and colored ornamental pieces 3 combined and arranged to form a pattern or motif. In FIG. 1(*a*), hot-melt films 5 are pressed directly against a surface of a base sheet material 1 such as of cloth, plastics or aluminum and fused thereto with heat applied from the reverse side and ornamental elements 4 of reflective foil or sheet material, which are rectangular, for example, in shape, are arranged and stuck to the base sheet material 1. FIG. 1(*b*) shows a thermally transferrable print sheet comprising a base sheet material 1 composed of a sheet of paper 7 and a sticky adhesive layer 6 covering the sheet of paper 7, and ornamental pieces 2 arranged on and stuck to the upper surface of the adhesive layer 6. As is well known in the art, the thermally transferrable print sheet is brought into contact with a surface of fibrous cloth as of a garment, a wooden surface, or a papered wall to be provided with an ornamental motif so that upper hot-melt layers of the ornamental pieces 2 are pressed against the object surface, and the hot-melt layers are fused and stuck to the surface by heating means such as a heating roller. Then, the hot-melt layers are allowed to cool down, and the sheet of paper 7 covered with the adhesive layer 6 is peeled off, thereby transferring the print or pattern to the object surface. The ornamental pieces 2 thus include ornamental elements 4 adhering under pressure to the adhesive layer 6, an arrangement which is in reversed relation to that of FIG. 1(*a*). A thermally transferring printing machine is generally used as the heating roller.

According to an arrangement shown in FIG. 1(*c*) differently colored ornamental pieces 3 coated with thermally transferrable printing ink particles are placed between adjacent ornamental pieces 2 structured as shown in FIG. 1(*b*).

A known general practice to produce such a pattern, that is, a motif in which a printed pattern and ornamental pieces are mixed together; is to print a pattern in advance on a base material such as of fibrous cloth, and then to sew ornamental pieces manually to the base material one by one according to the printed pattern. Such a prior procedure results in low productivity. With the embodiment of the invention as illustrated in FIG. 1(*c*), mixed patterns of the kind described can easily be massproduced. The colored ornamental pieces 3 include thermally transferrable layers 9 of printing ink particles coated on thin paper layers 8.

Figure 2:
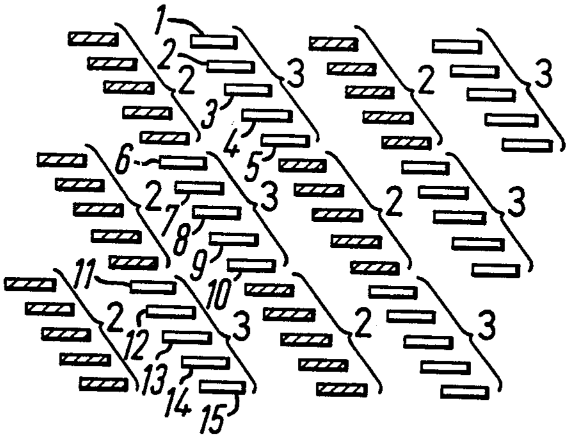
FIG. 2 is a view showing a pattern or motif in which the ornamental pieces shown in FIG. 1(*c*) are decoratively arranged.

FIG. 2 illustrates a motif pattern in which groups of ornamental pieces 2 and colored ornamental pieces 3 as shown in FIGS. 1(*c*) are alternately arranged widthwise or diagonally on the base material.

THE APPARATUS

Figure 3:
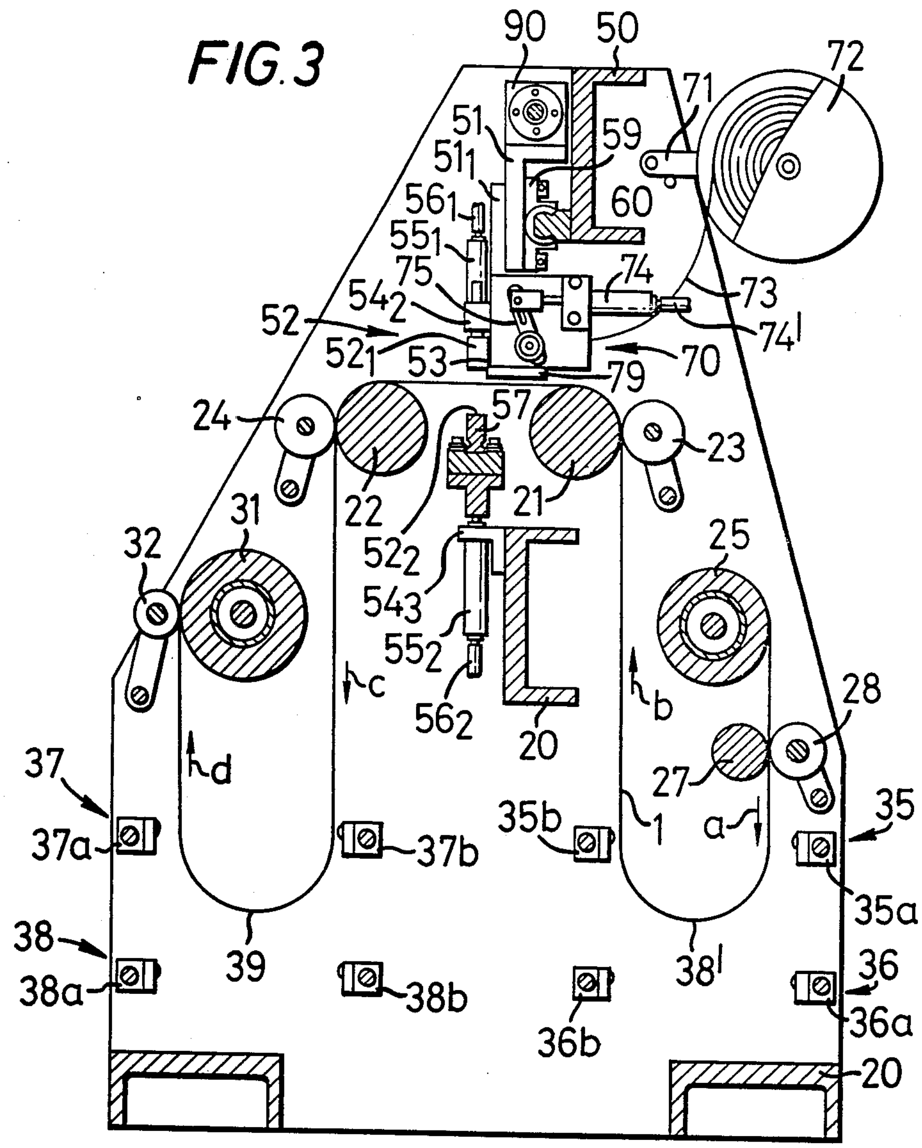
FIG. 3 is a vertical cross-sectional view, as seen sideways, of an apparatus of the present invention, the view being taken along line III—III of FIG. 4.
Figure 4:
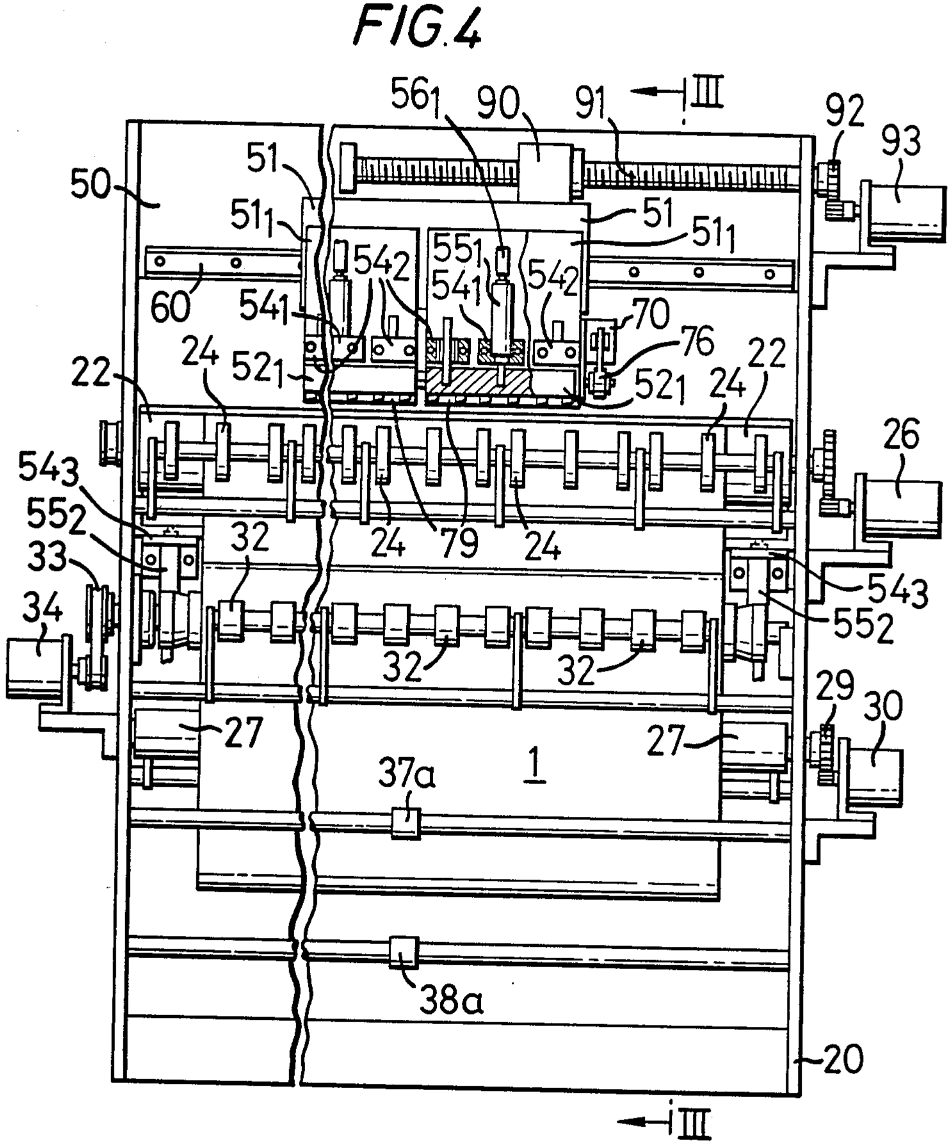
FIG. 4 is a fragmentary front elevational view of the apparatus illustrated in FIG. 3.

FIG. 3 shows an embodiment of an apparatus for sticking ornamental pieces in a pattern onto an elongate base sheet material, FIG. 3 being a vertical cross-sectional view, as seen sideways, taken along line III—III of FIG. 4 in the longitudinal direction of the base sheet material 1. FIG. 4 is a fragmentary front elevational view as seen from the lefthand side of FIG. 3 and FIGS. 5(*a*) and (*b*) are perspective views of portions of the apparatus.

Designated in these figures at 20 is a stationary base frame housing all parts of the apparatus therein. The base frame 20 supports centrally therein a pair of positioning rollers 21, 22 extending parallel to each other in spaced relation and having shafts rotatably journalled on the base frame 20. A base sheet material 1 extends tautly around the positioning rollers 21, 22. A multiplicity of pressing rollers 23, 24 are spaced at intervals widthwise of the base sheet material 1 and resiliently held against the positioning rollers 21, 22 with the base sheet material 1 gripped there-between, so that the base sheet material 1 has a horizontal portion kept normally taut between the positioning rollers 21, 22 against sagging.

Figure 5A:
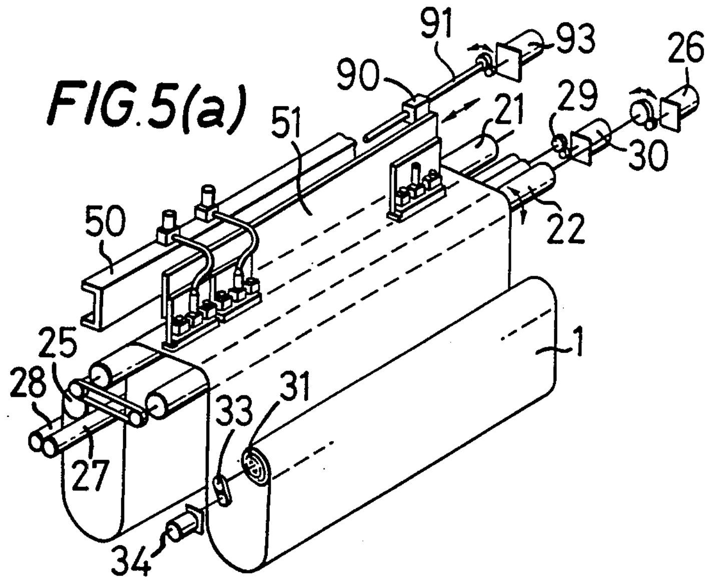
FIG. 5(*a*) is a perspective view of the apparatus.
Figure 5B:
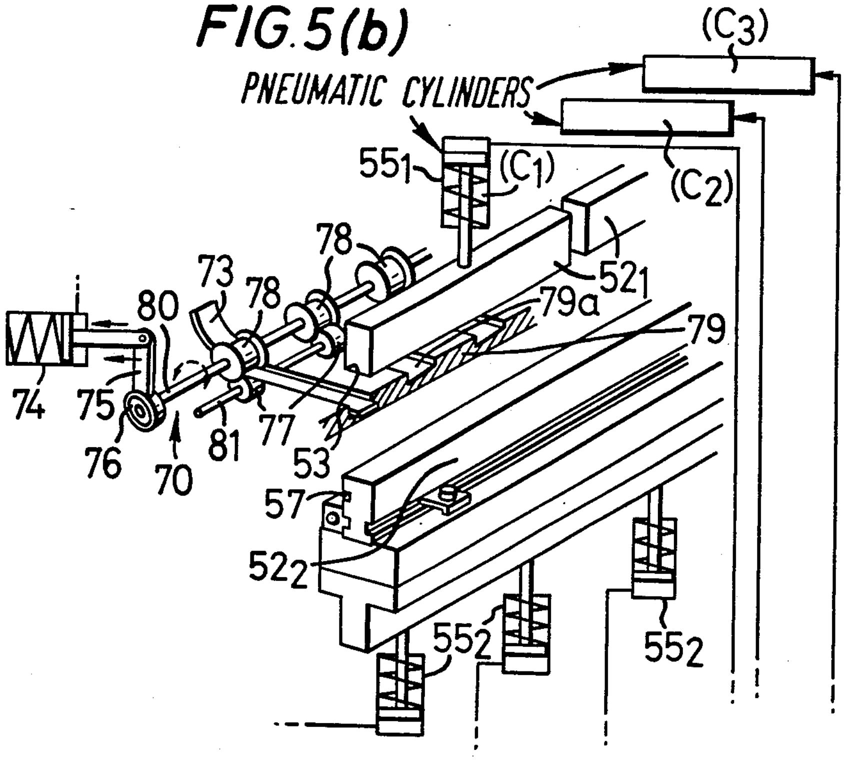
Figure 5C:
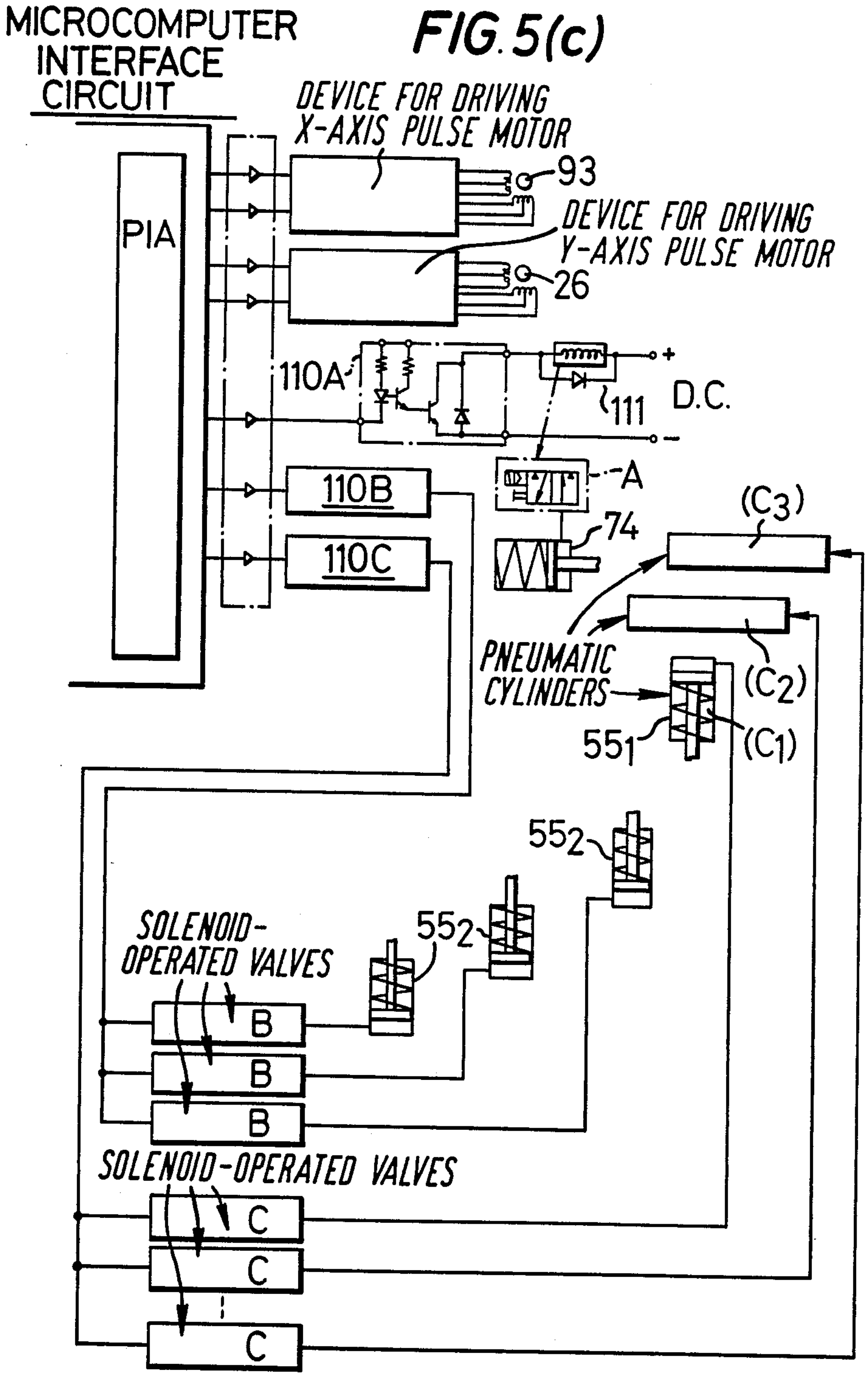

The base sheet material 1 can be longitudinally fed for positioning purpose by a pulse motor 26 (FIG. 4) for X-axis drive coupled via a speed reducer gearing to the shaft of the positioning roller 22 located on the lefthand take-up side as shown in FIG. 3. When the positioning roller 22 is rotated counterclockwise a predetermined distance, the base sheet material 1 is fed along from the right to the left as shown in FIG. 3. The base sheet material 1 is supplied from a roll 25 of base sheet material downwardly in the direction of the arrow A as the sheet material is sandwiched between a feed roller 27 and a presser roller 28. The feed roller 27 serves as a drive roller which, as shown in FIGS. 4 and 5(*a*), is coupled via a pair of speed reducer gears 29 to a motor 30 for feeding the base sheet material 1. Thus, the base sheet material 1 is supplied under the control of the motor 30. A take-up roll 31 for winding the base sheet material 1 is provided with a number of presser rollers 32 arranged in a row and spaced at intervals widthwise of the base sheet material 1. As the take-up roll 31 winds the base sheet material 1 upwardly in the direction of the arrow d, the presser rollers 32 are pressed against the sheet material 1 fully along the width thereof to assure tight and uniform roll of the sheet material 1. The take-up roll 31 has a shaft connected through a pair of speed reducer pulleys 33 to a take-up motor 34 as illustrated in FIG. 5(*a*). Thus, the base sheet material 1 is wound on the take-up roll 31 under the control of the take-up motor 34. Designated at 35, 36, 37, 38 in FIG. 3 are groups of units for monitoring the level of the base sheet material 1, the groups of units being provided on the feed and take-up sides of the apparatus and comprising photo-electric switches. Those units which have reference numerals with a suffix of "a" serve as sources of light, and those which have a suffix of "b" serve as photosensitive devices.

As ornamental pieces are repeatedly stuck onto a surface of the base sheet material 1, the base sheet material 1 is withdrawn from the supply roll 25, fed along paths extending in the directions of the arrows a, b, c, d and wound on the take-up roll 31. In the illustrated embodiment, the base sheet material 1 includes U-shaped portions that hang loose on both the feed and take-up sides of the apparatus. However, the base sheet material 1 may be fed by the supply roll 25 to the take-up roll 31 as the base sheet material is kept taut between the rolls and rollers. The latter arrangement is disadvantageous in that where the base sheet material 1 is made of a thin sheet of paper, complicated and hence expensive mechanisms are required to adjust tensioning of the base sheet material and synchronous rotation of the rolls and rollers.

The monitoring units on the feed side serve to monitor a lowest hanging portion 38' of the base sheet material 1 at all times and maintain the portion 38' within a constant range of level, and are comprised of an upper photo-electric switch 35 and lower photo-electric switch 36. When the lowest hanging portion 38' of the base sheet material 1 is lifted upwardly clear of a beam of light emitted from the light of source **35*a*, the beam of light reaches the photosensitive device 35*b* whereupon the photosensitive switch 35 is actuated driving the feed motor 30 coupled to the sheet material feed roll 25 to feed the base sheet material 1. When the lowest hanging portion 38' descends until it blocks a beam of light in the lower photoelectric switch 36, the switch 36 is actuated to de-energize the feed motor 30 stopping the feeding of the base sheet material 1. Therefore, the lowest hanging portion 38' of the base sheet material 1** is always maintained within a vertical range defined between the positions of attachment of the upper and lower photoelectric monitoring units.

Likewise, when a lowest hanging portion 39 of the base sheet material 1 on the take-up side of the apparatus is raised clear of a light beam emitted from the light source **37*a* of the upper photoelectric switch 37, the light beam is detected by the photosensitive device 37*b* and the upper photoelectric switch 37 is actuated to de-energize the take-up motor 34 coupled to the take-up roll 31, whereupon the lowest hanging portion 39 starts to descend. When the lowest hanging portion 39 is lowered to a point at which it prevents a beam of light generated by the light source 38*a* of the lower photoelectric switch 38 from reaching the photosensitive device 38*b*, the lower photoelectric switch 38 is actuated to energize the take-up motor 34 thus raising the lowest hanging portion 39. Accordingly, the lowest end 39 of the U-shaped hanging portion of the base sheet material 1** on the take-up side is always maintained within a vertical range defined between the positions in which the upper and lower photoelectric monitoring units are disposed.

Above the base sheet material 1 as kept taut between the positioning rollers 21, 22, there is disposed a channel-shaped beam 50 fixed to the stationary base frame 20 and extending widthwise of the base sheet material 1. A presser head unit for cutting out and sticking ornamental pieces is slidably supported on the fixed beam 50 by a slidable guide mechanism. A support member 51 supports thereon heads 52 for sticking ornamental pieces onto the base sheet material 1 and a mechanism 70 for intermittently feeding ornamental tapes. The support member 51 is slidably supported in over-hanging relation on a rectilinear guide track 60 secured to an outer surface of a web of the fixed beam 50 and extending parallel to the axes of the positioning rollers 21, 22. A sliding unit 59 which rides on rotatable steel balls is fitted over the guide track 60 and constitutes a slidable guide of high precision which can withstand a large load. Attachment plates $51_1$ are secured to the support member 51 on the left hand side thereof (FIG. 3) and support thereon press heads $52_1$ located upwardly of the base sheet material 1 and having cutting edges 53, the press heads $52_1$ being movable downwardly by pneumatic cylinders $55_1$. Indicated at $54_2$, are fixtures for the pneumatic cylinders $55_1$, and at $56_1$ air supply pipes connected to the pneumatic cylinders $55_1$. An anvil $52_2$ having an electric heater 57 is disposed below the base sheet material 1 opposite the lower faces of the press heads $52_1$ and extends the full width of the base sheet material 1, the anvil $52_2$ being upwardly movable by pneumatic cylinders $55_2$. Designated at $54_3$ are fixtures for the pneumatic cylinders $55_2$ and at $56_2$ air supply pipes connected to the pneumatic cylinders $55_2$.

THE TAPE SUPPLY MECHANISM

The tape supply mechanism 70 is disposed adjacent to the head 52 for intermittently supplying the ornamental tape in timed relation to operation of the head 52. As illustrated in FIGS. 3 and 5(*b*), the tape supply mechanism 70 comprises an air supply pipe 74', a pneumatic cylinder 74 for withdrawing the ornamental tape, a one-way or freewheeling roller clutch 76, tape feed rollers 77, 78, which appear in FIG. 5(*b*), and a guide plate 79 for the tapes. The ornamental tapes 73 are played off from tape reels 72 mounted on reel support arms 71 attached to the base frame 20.

The tape supply mechanism 70 is illustrated in FIG. 5 (*b*) in a manner to facilitate a fuller understanding. The pneumatic cylinder 74 coupled to a solenoid-operated spool valve A, shown in FIG. 5(*c*), has a piston connected to a pivot lever 75 which is coupled to a rotatable feed shaft 80 through the one-way roller clutch 76. When the pivot lever 75 is angularly moved counterclockwise in the direction of the arrows, the feed shaft 80 rotate. On a return stroke of the piston, only the pivot lever 75 is turned clockwise and the shaft 80 is not driven. The tape feed rollers 78 (three in the illustrated embodiment) are fixed to the rotatable feed shaft 80 and correspond in number to the heads 52, the tape feed rollers 78 having flanges. The tape feed rollers 77 are fixed to a driven shaft 81 extending parallel to the feed shaft 80 and are paired with the flanged tape feed rollers 78. The ornamental tapes 73 as they are reeled out of the tape reels 72, shown in FIG. 5 (*c*), are held in frictional engagement between the flanged feed rollers 78 and the feed rollers 77, and are guided into grooves 79*a* defined in the guide plate 78.

Figure 6A:
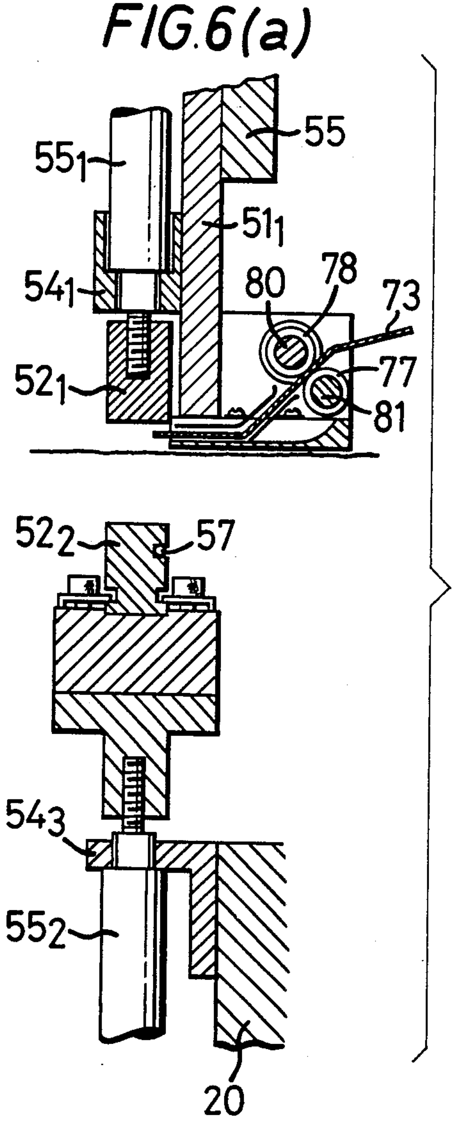
FIGS. 6(*a*) and (*b*) are fragmentary cross-sectional views of a sticking head with an ornamental tape shown as being drawn, FIG. 6 (*a*) being illustrative of the position before the tape is cut off, and FIG. 6 (*b*) the position after the tape has been severed.
Figure 6B:
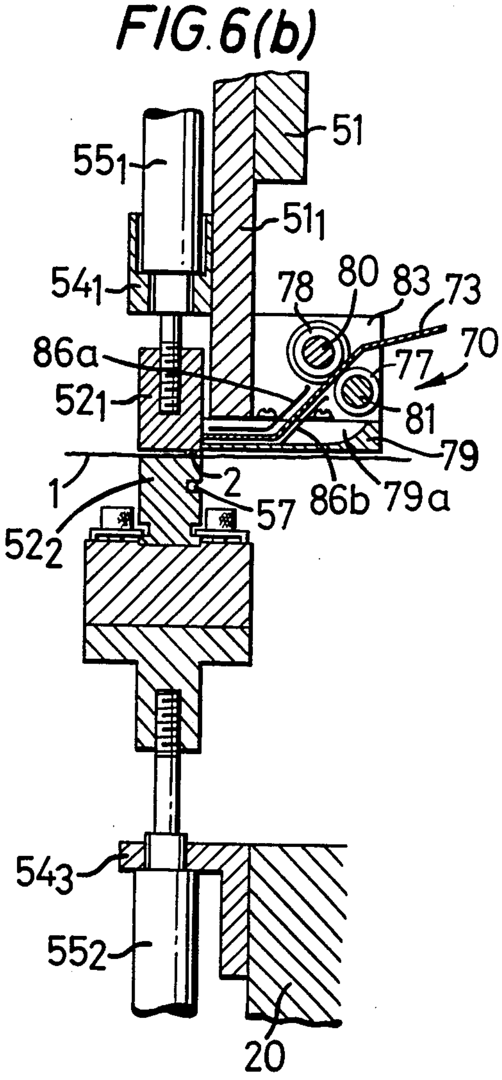
Figure 6C:
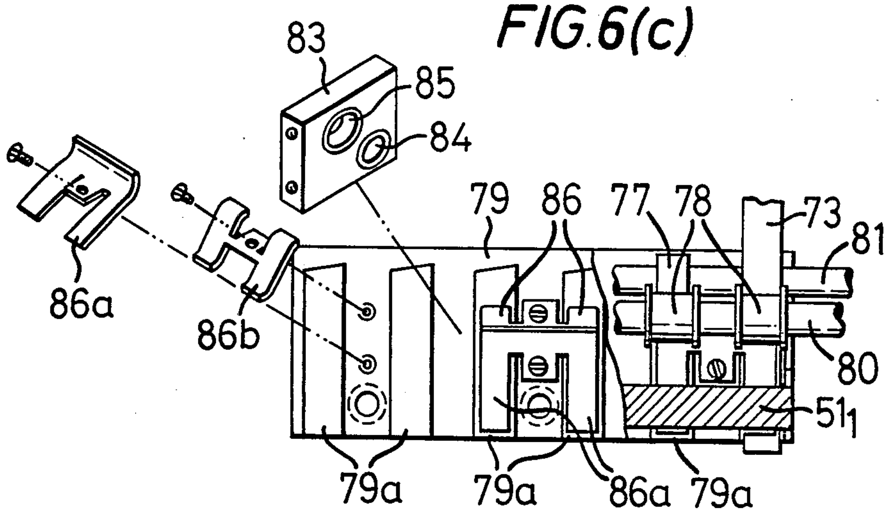

The construction of such a tape guide will be described in detail with reference to FIGS. 6(*a*), 6(*b*) and 6(*c*). The tape feed shaft 80 and driven shaft 81 are rotatably supported by needle bearings 84, 85 on brackets 83 mounted at intervals on the attachment plate $51_1$, as shown in FIG. 6(*c*). The guide plate 79 is attached to the bottoms of the brackets 83 opposite the press heads $52_1$. In each of the grooves 79*a*, there are disposed upper and lower guide leaves 86*a*, 86*b*. These guide leaves are resilient and deformable relative to the guide plate 79 for defining a passage for guiding the tape to be delivered along the groove. As shown in FIG. 6 (*c*), the upper and lower guide leaves 86*a*, 86*b* are constructed in pairs and are positioned in the grooves 79*a* which are shown as being six in number. Only the guide plate 79 is shown at the two grooves 79*a*, 79*a* on the left hand end of the guide plate in FIG. 6 (*c*). The two central grooves 79*a*, 79*a* are illustrated as receiving therein the guide leaves screwed to the guide plate 79. The tape feed rollers 77, 78 are shown assembled below the attachment plate $51_1$ at the fifth groove 79*a*. The tape 73 is shown inserted in the final groove 79*a*.

POSITIONING THE STICKING HEAD

To allow the head 52 to be positioned width-wise of the base sheet material 1, the support member 51 has on its top a worm drive unit 90 having therein a nut through which extends a threaded rod 91 that is rotatable about its own axis and mounted on the stationary frame 20, shown in FIGS. 4 and 5(*a*). The threaded rod 91 is coupled via a speed reducer gearing 92 to the shaft of an X-axis pulse motor 93 for moving the worm drive nut 90 therealong when the rod 91 rotates about its own axis.

Control operation for positioning the ornamental pieces 2, 3 on the base sheet material 1 is effected in order to follow the positions of ornamental pieces on a pattern which has been designed in advance. Such an operation may easily be carried out by way of positioning control performed by a known computer through an electric control circuit. The step of supplying ornamental tapes subsequent to the step of positioning control, and the step of cutting and sticking the cut pieces of the ornamental tapes are effected according to a predetermined electric control sequence. During such a process, solenoid operated valves attached in various locations are actuated in timed relation by sequence-controlled pulse signals issued from the computer for driving associated pneumatic cylinders.

Figure 7:
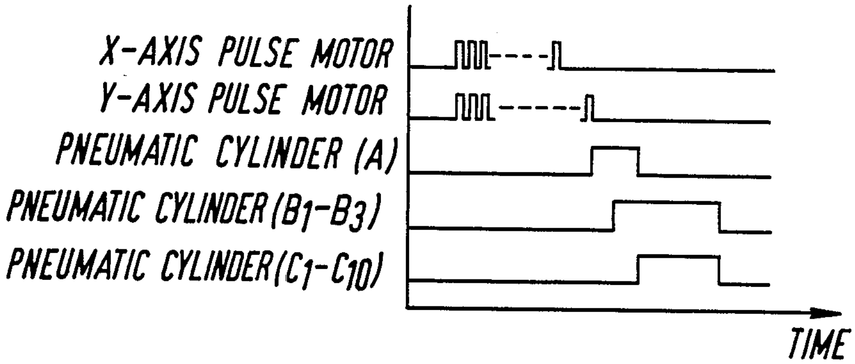
FIG. 7 is a timing chart for sticking operations according to the present invention.

FIG. 7 is a timing diagram showing operations of X-axis and Y-axis pulse motors, and solenoid-operated spool valves A, B, C respectively for the pneumatic cylinder for supplying the ornamental tapes, the pneumatic cylinders for actuating the heatable anvils, and the pneumatic cylinders for actuating the press heads. As shown in FIG. 7, the X-axis pulse motor 93 for moving the support member 51 and the Y-axis pulse motor 26 for feeding the base sheet material 1 are energized simultaneously to determine a position in which ornamental pieces are stuck onto the sheet material 1. As soon as such a positioning operation has been completed, the solenoid-operated valve A is actuated to cause the pneumatic cylinder 74 to feed the ornamental tapes. Then, while the solenoid-operated valve A is in operation, the pneumatic cylinders $55_2$ are actuated by the solenoid-operated valves B to thereby move the anvil $52_2$ upwardly. When the pneumatic cylinder 74 finishes its operation supplying the ornamental tapes, the solenoid-operated valves C are operated to actuate the pneumatic cylinders $55_1$ thus lowering the press heads $52_1$. One cycle of operation for sticking ornamental pieces onto the base sheet material 1 is thus completed. Such a cycle of operation will successively be repeated until a desired pattern or motif of ornamental pieces is created on the base sheet material 1.

CONTROL CIRCUITRY

Figure 8:
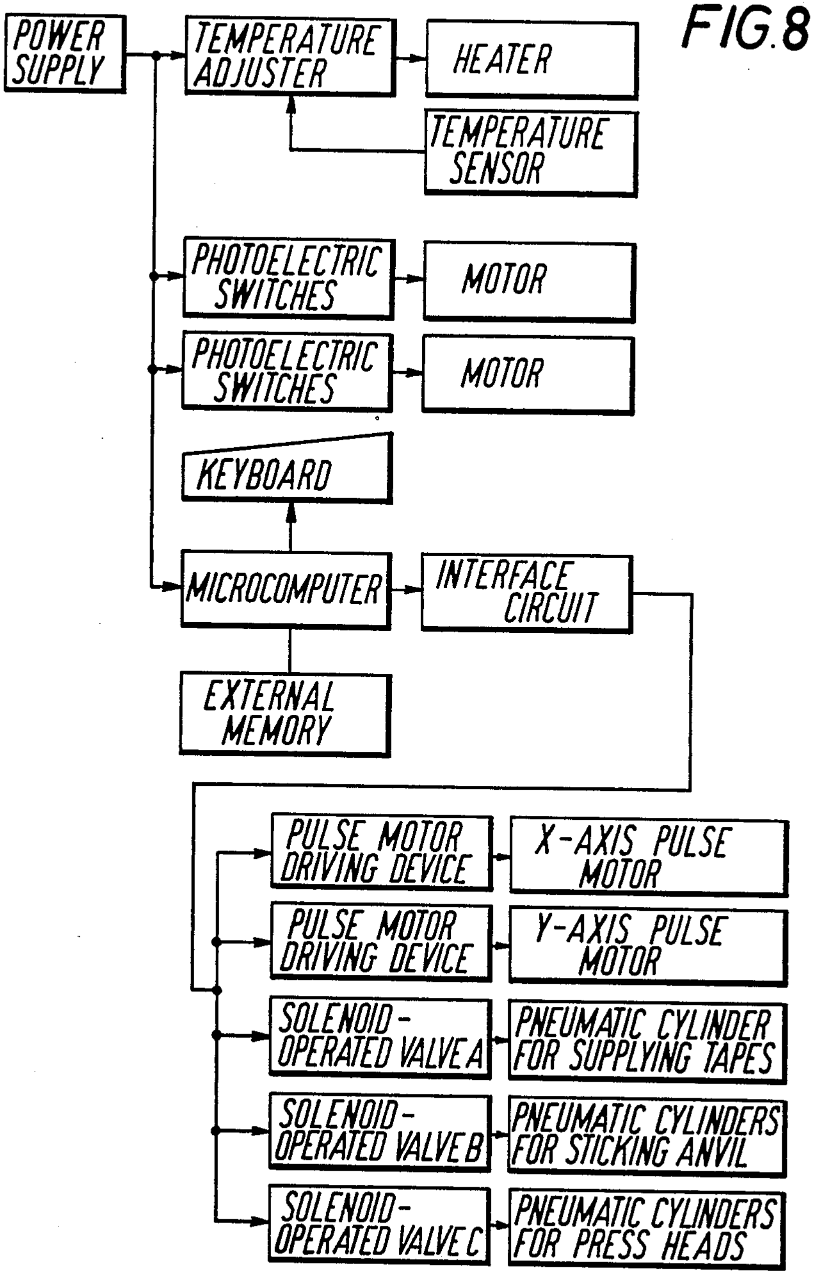
FIG. 8 is a block diagram of electric control systems of the present invention.

FIG. 8 is a block diagram of electric control circuit systems for the apparatus of the present invention. The control circuit systems include a system for adjusting the temperature at which the anvil is heated, a system of photoelectric switches associated with arrangements for supplying and winding the base sheet material 1, and an electric sequence circuit system for controlling the X-axis and Y-axis pulse motors to determine an ornamental piece sticking position and also for controlling the pneumatic cylinders. More specifically, the system for adjusting the temperature at which to heat the anvil has a temperature sensor for detecting the temperature to effect feedback control, when the temperature is varied, to operate a temperature adjuster automatically for maintaining the anvil at a predetermined temperature. The electric circuits of the drive motors on the feed and take-up sides of the apparatus are associated with the upper and lower photoelectric switches for automatic energization and de-energization of the drive motors. In order to enable ornamental pieces to be positioned and stuck onto the base sheet material in accordance with a pattern previously prepared, the positions of ornamental pieces are read from such a pattern and numerical data on the arrangement of the ornamental pieces are input to a microcomputer through a keyboard. Then, output pulses corresponding to the numerical positioning data start being supplied from the microcomputer in accordance with the program thus prepared in advance. The numerical data with respect to the pattern of the ornamental pieces may be stored in an external memory for subsequent repeated use. Timed output pulses to be supplied to a circuit for controlling the solenoid-operated valves to actuate the pneumatic cylinders can be produced on the basis of information on a sequence in the above program.

MICROCOMPUTER INTERFACE

FIG. 5(*c*) shows a circuit for delivering a variety of signals supplied from a PIA (parallel interface adapter) in the output of the microcomputer through an interface circuit to the operating parts of the apparatus. More specifically, pulsed signals and signals for determining whether the phase is normal or opposite are issued from the microcomputer via the interface circuit to devices for driving the X-axis and Y-axis pulse motors 93, 26, in which devices the direction of rotation of the pulse motors is decided. At the same time, rotors of permanent magnets are angularly moved with respect to polyphase-winding exciting stators through angular intervals which depend on the number of input pulses. In the embodiment illustrated, hybrid pulsemotors of the four-phase winding and two-phase exciting type are employed. The pneumatic cylinder 74 for supplying the ornamental tapes is actuated when the solenoid-operated spool valve A is opened upon energization of a solenoid 111 thereof which is controlled by an exciting circuit including a solid-state relay 110A closable by an output pulse supplied from the microcomputer. When the solid-state relay 110A is closed by the output pulse from the microcomputer, the exciting circuit is energized to open the solenoid-operated valve A.

The solenoid-operated valves B, C for operating the pneumatic cylinders 55$_2$, 55$_1$, for the anvil 52$_2$ and the press heads 52$_1$ are actuatable by exciting circuits which are identical in construction with the exciting circuit for actuating the pneumatic cylinder 74. Thus, such exciting circuits are not shown in detail except for solid-state relays 110B, 110C connected to the output of the microcomputer.

The microcomputer has a timer switch function provided by the program prepared. The timing at which output signals are issued from the microcomputer and intervals of time for which such output signals are continuously supplied are easily controllable by the program. Such timing for delivering outputs and periods of time for supplying the outputs can be selected to meet conditions in which ornamental pieces are to be stuck onto the base sheet material.

OPERATION

Operation of the apparatus for sticking ornamental pieces onto a base sheet material in a pattern will be described. As described before, ornamental pieces having hot-melt layers may be applied directly to an object base material to form a pattern by thermally fusing the hot-melt layers. Alternatively, a thermally transferrable print sheet may be fabricated with a base sheet material made of paper, or film or sheet of other material coated with a sticky adhesive layer on its surface. With the latter alternative, it is not necessary to heat the anvil. The following description is directed to a case where ornamental pieces are stuck in a pattern directly onto a surface of a piece of fibrous cloth, a sheet of plastics, a foil of aluminum, a sheet of wood, and the like.

Information on the positions of ornamental pieces in an original pattern in which they are arranged, that is, numerical data (arranged pattern data) on positioning displacement are input through the keyboard into the microcomputer to prepare a program. If there is available an external memory such as a magnetic tape which already stores numerical data concerning such an arranged pattern of ornamental pieces, the microcomputer may be supplied with necessary pattern data from such a memory. The microcomputer issues desired pulsed output signals or sequence control signals in accordance with command numerals of the pattern data to energize the pulse motors and solenoid-operated valves for positioning the press heads and the sheet material, supplying the ornamental tapes, and severing and sticking ornamental pieces onto the sheet material at desired times for desired periods of time.

Output signals related to the pattern numerals supplied from the microcomputer first enable the X-axis pulse motor 93 to be driven to the extent determined by the number of input pulses applied, rotating the threaded rod 91 about its own axis for a given number of revolutions in a normal or opposite direction. The rotation of the rod 91 causes the support member 51 to be threadedly fed along the rod 91 widthwise of the base sheet material 1 until the heads 52 arrive at a position above the base sheet material 1 where ornamental pieces are to be stuck onto the base sheet material 1. Simultaneously, with the starting of the X-axis pulse motor, the Y-axis pulse motor 26 is supplied with a given number of pulses and rotates in a normal or opposite direction, thus feeding the base sheet material 1 in a longitudinal direction thereof. Thus, the pulse motors 26, 93 are energized at the same time until an ornamental piece sticking position is reached. After the positioning operation has been completed, the relay 110A is closed by an input signal supplied from the microcomputer to open the solenoid-operated valve A, actuating the pneumatic cylinder 55$_1$, for supplying the ornamental tapes. The pivot lever 75 now causes the one-way roller clutch 76 to angularly move the feed shaft 80 through a predetermined angle, whereupon the flanged feed rollers 78 on the feed shaft 80 and the feed rollers 77 on the driver shaft 81 are caused to rotate concurrently to draw the ornamental tapes by a length sufficient to accommodate the desired ornamental pieces immediately below the heads 52.

While the pneumatic cylinder 74 is in operation, the relay 110B is closed by an input pulse signal applied thereto, thus closing the solenoid-operated valves B ($B_1$, $B_2$, $B_3$) to actuate the pneumatic cylinders 55$_2$ which raise the anvil 52$_2$. The anvil 52$_2$ has been heated up to a desired temperature prior to the start of the operation. Thus, as the anvil $52_2$ is raised into contact with the underside of the base sheet material, the hot-melt layers in the ornamental pieces are fused to the base sheet material. Finally, the press heads $52_1$ are actuated such that, as shown in FIG. 7, the pneumatic cylinders $55_1$ for the press heads $52_1$ start operating when the pneumatic cylinder 74 for the tape supply mechanism is deactivated, and are rendered inoperative when the pneumatic cylinders $55_2$ for the anvil $52_2$ become inactivated.

During downward movement of the press heads $52_1$, the cutting edge 53 cut off the ornamental tapes as drawn, and the press heads $52_1$ push severed ornamental pieces downwardly until the ornamental pieces are stuck onto the base sheet material at predetermined positions as the hot-melt layers are fused under heat applied by the anvil $52_2$. The heads 52 arranged rectilinearly in an array on the support member 51 enable as many ornamental pieces as the ornamental tapes are supplied to be simultaneously applied to the base sheet material. One cycle of sticking operation is thus completed.

Such a cycle may be repeated in accordance with a decorative motif or pattern prepared in advance until a desired pattern of ornamental pieces is stuck onto the base sheet material.

According to the foregoing operation, the ornamental pieces covered with hot-melt films are stuck directly onto a base sheet material. For fabricating a thermally transferrable print sheet, a sheet as of paper having a sticky adhesive layer thereon is used as a base material, and the heater in the anvil $52_2$ will remain de-energized.

With the arrangement of the present invention, as described above, ornamental pieces can speedily be stuck in a desired pattern onto a base sheet material such as of cloth. A variety of ornamental pieces having different shapes and colors and covered with hot-melt layers can easily be positioned and applied to a base sheet material in accordance with various patterns created as desired. Furthermore, thermally transferrable print sheets can be mass-produced.

I claim:

1. A method of applying articles to the surface of a web comprising:

(a) moving a web stepwise in a longitudinal direction to position the web;

(b) cutting an article from a tape and pressing that cut article onto the surface of the positioned web at a selected one of a plurality of selectable positions along a line extending across the web in a widthwise direction generally transverse to the longitudinal direction during a period between stepwise movements of the web, the cut article being pressed onto the web with a heat activable adhesive coating between the web and the cut article for sticking the cut article to the web;

(c) heating the adhesive coating to activate it; and (d) repeating a cycle including steps (a), (b) and (c) to form a pattern of articles on the web.

2. The method of claim 1 in which step (b) comprises cutting the article from the tape and pressing that cut article onto the web surface in one continuous step.

3. The method of claim 1 in which step (d) comprises repeating step (b) for a plurality of repetitions after a single repetition of step (a), each of the plurality of repetitions of step (b) comprising positioning a respective cut article like the first-mentioned cut article along the widthwise line extending across the web.

4. The method of claim 1 in which the tape has a layer of the heat activable adhesive coating and step (b) comprises cutting the article from the tape having a heat activable layer of adhesive.

5. A method of applying articles to the surface of a web to form a pattern of articles on the web comprising:

(a) moving a web in a longitudinal direction to position the web;

(b) in one continuous step, cutting an article from a tape and pressing that cut article onto the surface of the positioned web with an adhesive coating between the web and the cut article for sticking the cut article to the web; and (c) repeating step (a), and repeating step (b) for a plurality of repetitions after a single repetition of step (a), each of the plurality of repetitions of step (b) comprising positioning a respective cut article like the first-mentioned cut article on the web surface along a line across the web, the line extending generally transversely to the longitudinal direction.

6. A method of applying articles to the surface of a web comprising:

(a) moving a web in a longitudinal direction to position the web;

(b) in one continous step, cutting an article from a tape and pressing that cut article onto the surface of the positioned web with an adhesive coating that is heat activable between the web and the cut article for sticking the cut article to the web and heating the adhesive coating between the web and the cut article to activate the adhesive coating; and (c) repeating steps (a) and (b) to form a pattern of of articles on the web.

7. A method of applying articles to the surface of a web comprising:

(a) moving a web in a longitudinal direction to position the web;

(b) in one continuous step, cutting an article from a tape and pressing that cut article onto the surface of the positioned web wherein a first adhesive coating covers the surface of the web with the first adhesive coating being between the web and the cut article for sticking the cut article to the web and with a second adhesive coating on a side of the cut article and activable for providing a thermally transferable print; and (c) repeating steps (a) and (b) to form a pattern of of articles on the web.

8. Apparatus for applying articles to a web, comprising:

transport means for transporting a web longitudinally in a first direction along a feed path;

applying means along the feed path for applying articles to the surface of the web with a heat activable adhesive coating between the articles and the web; the applying means being for applying the articles at any of a plurality of selectable positions along a widthwise line extending in a second direction across the web generally transverse to the first direction, the applying means comprising cutting means for cutting each of the articles to be applied from a tape, comprising pressing means for pressing each cut article onto the surface of the web along the widthwise line, and comprising heating means for activating the adhesive coating for sticking each article to the web; and control means for controlling the transport means and the applying means, the control means being operable for controlling the applying means for applying at least one of the cut articles at a corresponding selected one of the selectable positions along the widthwise line until a predetermined number of the cut articles is applied along the widthwise line and for controlling the transport means for transporting the web in the first direction after the predetermined number of articles is applied.

9. The apparatus of claim 8 in which the applying means further comprises positioning means for positioning each of the cut articles at the corresponding selected position along the widthwise line.

10. The apparatus of claim 9 in which the control means further controls the positioning means, the control means comprising a microprocessor for controlling the transport means for transporting the web in the first direction and for controling the positioning means for positioning each of the cut articles along the width-wise line, the microprocessor being operable for controlling a sequence of operations for producing a predetermined pattern of the articles on the web.

11. The apparatus of claim 8 in which the tape from which the articles are cut comprises a layer of heat activable adhesive for forming the adhesive coating between the articles and the web; the web having a first side for receiving the articles and a second side opposite the first side; the pressing means comprising a pressing head disposed on the first side of the web; the heating means comprising an anvil member disposed on the second side of the web; the pressing head being operable for pressing each of the cut articles onto the surface of the first side of the web against the anvil member; the applying means further comprising heating means for heating the anvil member for actuating the adhesive coating when the pressing head presses each cut article onto the web against the anvil member.

12. The apparatus of claim 8 in which the transport means comprises a position roller for contacting the web and a first numerically controlled driving device coupled to the roller for turning the roller for moving the web in the first direction; the control means being operable for providing first input commands to the first driving device, each first input command being for moving the web a respective predetermined distance in the first direction; the applying means further comprising a guide track extending in the second direction across the feed path generally along the width-wise line across the web, a support member supported by the guide track for sliding along the guide track, and a second numerically controlled driving device coupled to the support member along the guide track for moving the support member in the second direction; the control means being further operable for providing second input commands to the second driving device, each second input command being for moving the support member a respective predetermined distance in the second direction; the applying means further comprising a feeding mechanism operable for feeding the tape from which the articles are cut, the pressing means comprising a pressing head, the cutting means comprising a cutting edge on the pressing head for cutting the articles from the tape after the tape is fed by the feeding mechanism.

13. The apparatus of claim 12 in which the web has a first side for receiving the articles and a second side opposite the first side; the pressing head being disposed on the first side of the web; the applying means further comprising an anvil member disposed on the second side of the web: the pressing head being operable for pressing each of the cut articles onto the surface of the first side of the web against the anvil member; the applying means further comprising heating means for heating the anvil member for actuating the adhesive coating when the pressing head presses the cut articles onto the web against the anvil member.

14. Apparatus for applying articles to a web, comprising:

transport means for moving a web in a longitudinal direction along a feed path;

applying means along the feed path for applying articles at any of a plurality of selectable positions along a line extending across the web in a widthwise direction generally transverse to the longitudinal direction and for applying the articles to the surface of the web with an adhesive coating between the articles and the web, the applying means comprising cutting means for cutting each of the articles to be applied from a tape and pressing means for pressing each cut article onto the surface of the web; and control means for controlling the transport means and the applying means, the control means being operable for repeatedly controlling the transport means for moving the web into position and for repeatedly controlling the applying means for cutting each of the articles and for pressing each cut article onto the surface of the web at a corresponding selected one of the selectable positions while the web is in position.

15. The apparatus of claim 14 in which the applying means further comprises positioning means for positioning each of the cut articles at the corresponding selected position along the widthwise line across the web.

16. The apparatus of claim 15 in which the pressing means comprises a pressing head movable along the widthwise line, the positioning means comprising a driver for moving the pressing head along the widthwise line.

17. The apparatus of claim 16 in which the cutting means comprises a cutting edge on the pressing head, the applying means further comprising actuating means for moving the pressing head toward the web, the cutting edge cutting one of the articles from the tape as the actuating means moves the pressing head and the pressing head pressing that cut article onto the surface of the web.

18. The apparatus of claim 17 in which the control means further controls the positioning means, the control means being operable for controlling the driver of the positioning means for moving the pressing head to a predetermined position along the width-wise line and for controlling the actuating means for moving the pressing head and for cutting one of the articles and pressing that cut article onto the surface of the web at the predetermined position.

19. The apparatus of claim 14 in which the applying means comprises a pressing head, the cutting means comprising a cutting edge on the pressing head, the applying means further comprising actuating means for moving the pressing head towad the web, the cutting edge cutting one of the articles from the tape as the actuating means moves the pressing head and the pressing head pressing that cut article onto the surface of the web.

* * * * *